US012306090B2

(12) United States Patent
Chen et al.

(10) Patent No.: US 12,306,090 B2
(45) Date of Patent: May 20, 2025

(54) GAS CELL AND METHOD OF FORMING THE SAME

(71) Applicant: AGENCY FOR SCIENCE, TECHNOLOGY AND RESEARCH, Singapore (SG)

(72) Inventors: Weiguo Chen, Singapore (SG); Lennon Yao Ting Lee, Singapore (SG)

(73) Assignee: AGENCY FOR SCIENCE, TECHNOLOGY AND RESEARCH, Singapore (SG)

(*) Notice: Subject to any disclaimer, the term of this patent is extended or adjusted under 35 U.S.C. 154(b) by 272 days.

(21) Appl. No.: 18/042,681

(22) PCT Filed: Jul. 26, 2021

(86) PCT No.: PCT/SG2021/050435
§ 371 (c)(1),
(2) Date: Feb. 23, 2023

(87) PCT Pub. No.: WO2022/055416
PCT Pub. Date: Mar. 17, 2022

(65) Prior Publication Data
US 2023/0366813 A1    Nov. 16, 2023

(30) Foreign Application Priority Data

Sep. 9, 2020  (SG) ............................. 10202008801S

(51) Int. Cl.
*G01N 21/05* (2006.01)
*G01N 21/01* (2006.01)
*G01N 21/3504* (2014.01)

(52) U.S. Cl.
CPC ......... *G01N 21/05* (2013.01); *G01N 21/3504* (2013.01); *G01N 2021/0112* (2013.01)

(58) Field of Classification Search
CPC ............... G01N 21/05; G01N 21/3504; G01N 2021/0112
See application file for complete search history.

(56) References Cited

U.S. PATENT DOCUMENTS 5,003,174 A     3/1991   Daetwyler et al.
5,583,339 A  *  12/1996  Black .................. G01N 21/3504
                                                        250/343

(Continued)

FOREIGN PATENT DOCUMENTS

CN   203083924 U   7/2013
DE   3305982 A1   8/1984
JP   H06-034543 A   2/1994

OTHER PUBLICATIONS

Rezende et al.; "Micro Milled Microfluidic Photoionization Detector for Volatile Organic Compounds"; Micromachines; vol. 10; 2019; 12 pages.

(Continued)

*Primary Examiner* — Chih-Cheng Kao
(74) *Attorney, Agent, or Firm* — BakerHostetler

(57) ABSTRACT

Various embodiments may relate to a gas cell. The gas cell may include a chamber body. The gas cell may also include a chamber lid cooperating with the chamber body to form a space. The gas cell may further include an infrared source provided in a through hole of the chamber lid such that the infrared source extends through a thickness of the chamber lid. The gas cell may additionally include a detector provided in a through hole of the chamber body. The gas cell may further include an optical chip arranged within the space such that the optical chip is between the infrared source and the detector. The gas cell may also include three O-rings.

20 Claims, 21 Drawing Sheets (b)

(56) References Cited

U.S. PATENT DOCUMENTS 6,067,840 A * 5/2000 Chelvayohan ..... G01N 21/3504
250/343
2020/0072740 A1 3/2020 Venturini et al.

OTHER PUBLICATIONS

Jia et al.; "On-Chip Non-Dispersive Infrared CO2 Sensor Based On an Integrating Cylinder"; Sensor; vol. 19(19); Sep. 2019; 14 pages.
Popa et al.; "Towards Integrated Mid-Infrared Gas Sensors"; Sensors; vol. 19; 2019; 15 pages.
"Gas Sensors Components and Accessories"; https://www.eoc-inc.com/gas-sensors-components-accessories/; EOC; accessed Jan. 23, 2020; 5 pages.
"NDIR gas analyzer working principle"; www.purotech.cn/cn/Download/267.html; Suzhou Pulongen Electronic Technology Co. Ltd.; accessed Jan. 23, 2020; 8 pages (contains English Translation).
"FTIR Accessories"; https://science.nz/ftir-accessories/; ScieNZe; © 2020; accessed Jan. 23, 2020; 25 pages.
Data Sheet; https//www.specac.com/en/documents/data-sheets/storm-short-pathlength-gas-cell-datasheet; Specac Ltd.; accessed Jan. 23, 2020; 2 pages.
International Patent Application No. PCT/SG2021/050435; Int'l Search Report and Written Opinion; dated Oct. 4, 2021; 7 pages.

* cited by examiner

FIG. 2

- secure a chamber lid to a chamber body — 202
- provide an infrared source in a through hole of the chamber lid — 204
- provide a detector in a through hole of the chamber body — 206
- arrange an optical chip within the space — 208
- arrange a first O-ring — 210
- arrange a second O-ring — 212
- arrange a third O-ring — 214

(b)

Note:
Dimension in: mm

Note:
Dimension in: mm a) Prepare chamber body for assembly b) Place the chip c) Prepare chamber lid d) Tighten the lid d) Install the optical filter (optional)

Completed

GAS CELL AND METHOD OF FORMING THE SAME

CROSS-REFERENCE TO RELATED APPLICATION

The current application is a 371 national stage application of PCT International Application No. PCT/SG2021/050435 filed Jul. 26, 2021, and claims the benefit of priority of Singapore Application No. 10202008801S filed Sep. 9, 2020, the contents of which are hereby incorporated by reference in their entireties for all purposes.

TECHNICAL FIELD

Various embodiments of this disclosure may relate to a gas cell. Various embodiments of this disclosure may relate to a method of forming a gas cell.

BACKGROUND

Gas cells are used for measuring the infrared spectra of gases and gas mixtures. Typical gas cells are bulky and have a slow response, as the sample volume of each cell may be large and may require gas within the entire volume to be replaced with the new gas prior to each measurement.

A chip level gas cell may have a huge system to feed the gas into the chip for testing. If the chip level gas cell requires a chamber much larger than the gas cell, then the response time would still be long.

A typical system for measuring gas would involve a gas cell, which has an inlet and outlet that are welded to the gas cell to allow for connectors for the gas flow. This gas cell can be placed with a commercial Fourier Transform Infrared (FTIR) system or Continuous Emissions Monitoring System. In this arrangement, the sample volume is limited by the metallic or glass construction and welding of the connectors. The sample volume can be larger than 100 cm$^3$. An alternative setup may include the source and detector in the gas chamber itself. This arrangement may require proper sealing between the walls of the TO-cans of the source and detector, which is not practical.

SUMMARY

Various embodiments may relate to a gas cell. The gas cell may include a chamber body. The gas cell may also include a chamber lid cooperating with the chamber body to form a space. The gas cell may further include an infrared source provided in a through hole of the chamber lid such that the infrared source extends through a thickness of the chamber lid. The gas cell may additionally include a detector provided in a through hole of the chamber body. The gas cell may further include an optical chip arranged within the space such that the optical chip is between the infrared source and the detector. The gas cell may include a first O-ring arranged between the chamber lid and the chamber body. The gas cell may also include a second O-ring arranged between the optical chip and the chamber lid. The gas cell may additionally include a third O-ring arranged between the optical chip and the chamber body. The chamber body may include an inlet and an outlet so that the chamber body is configured to allow a gas to flow from the inlet through the optical chip.

Various embodiments may relate to a method of forming a gas cell. The method may include securing a chamber lid to a chamber body such that the chamber lid cooperates with the chamber body to form a space. The method may also include providing an infrared source in a through hole of the chamber lid such that the infrared source extends through a thickness of the chamber lid. The method may further include providing a detector in a through hole of the chamber body. The method may additionally include arranging an optical chip within the space such that the optical chip is between the infrared source and the detector. The method may also include arranging a first O-ring such that the first O-ring between the chamber lid and the chamber body. The method may further include arranging a second O-ring such that the second O-ring is between the optical chip and the chamber lid. The method may additionally include arranging a third O-ring such that the third O-ring is between the optical chip and the chamber body. The chamber body may include an inlet and an outlet so that the chamber is configured to allow a gas to flow from the inlet through the optical chip to the outlet.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

FIG. 2 is a general illustration of a method of forming a gas cell according to various embodiments.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the gas cells are analogously valid for the other gas cells. Similarly, embodiments described in the context of a method are analogously valid for a gas cell, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may relate to a gas sensor packaging and integration with modular design. This may enable gas to mainly flow through the chip based gas cell and limit the amount of sample volume to that of the chip, while ensuring that leakage is reduced or minimized. Reduction or minimization of leakage is important, especially in adopting this solution for commercial applications, as gases may be toxic or flammable.

Figure 1:
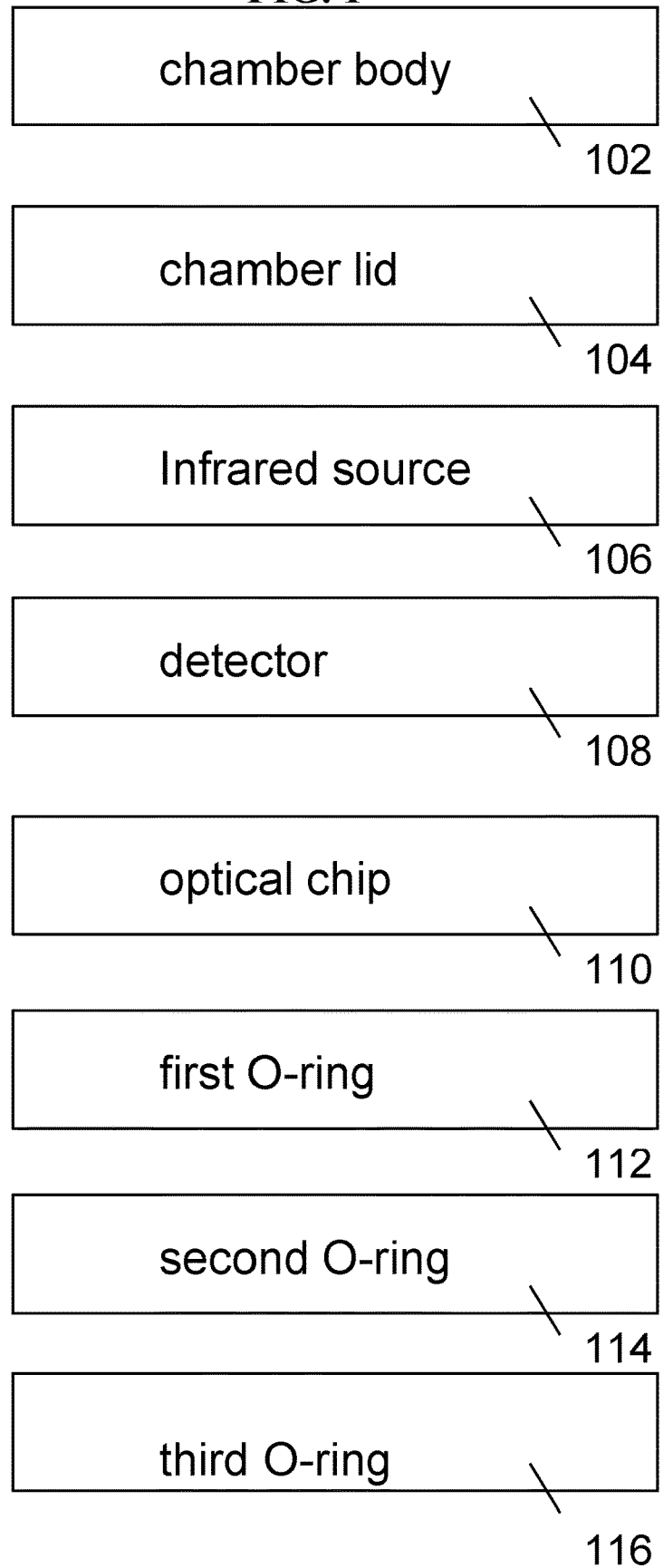
FIG. 1 is a general illustration of a gas cell according to various embodiments.

FIG. 1 is a general illustration of a gas cell according to various embodiments. The gas cell may include a chamber body 102. The gas cell may also include a chamber lid 104 cooperating with the chamber body 102 to form a space. The gas cell may further include an infrared source 106 provided in a through hole of the chamber lid 104 such that the infrared source 106 extends through a thickness of the chamber lid 104. The gas cell may additionally include a detector 108 provided in a through hole of the chamber body 102. The gas cell may further include an optical chip 110 arranged within the space such that the optical chip 110 is between the infrared source 106 and the detector 108. The gas cell may include a first O-ring 112 arranged between the chamber lid 104 and the chamber body 102. The gas cell may also include a second O-ring 114 arranged between the optical chip 110 and the chamber lid 104. The gas cell may additionally include a third O-ring 116 arranged between the optical chip 110 and the chamber body 102. The chamber body 102 may include an inlet and an outlet so that the chamber body 102 is configured to allow a gas to flow from the inlet through the optical chip 110.

In other words, the gas cell may include a chamber body 102 and a chamber lid 104 defining a space for accommodating an optical chip 110. The gas cell may further include an infrared source 106, a detector 108, as well as O-rings 112, 114 and 116.

For avoidance of doubt, FIG. 1 is intended to be a general illustration of the features present in various embodiments, and is not intended to limit the orientation, arrangement, shapes, sizes etc. of the various features.

In various embodiments, the second O-ring 114 and the third O-ring 116 may be configured to seal the optical chip 110. The second O-ring 114 and the third O-ring 116 may be positioned to prevent or reduce gas within the chamber from escaping through the gap between the optical chip 110 and the chamber to outside the gas cell. The first O-ring 112 may be arranged between the chamber lid 104 and the chamber body 102 to prevent or reduce gas within the chamber from escaping through the gap between the chamber lid 104 and the chamber body 102 to outside the gas cell. The O-rings 112, 114 and 116 may provide effective sealing without requiring complex mechanisms, thus keeping the gas cell small, and the cost of fabrication down.

In various embodiments, the first O-ring 112, the second O-ring 114, and/or the third O-ring 116 may include an elastomer material, e.g. a fluoropolymer elastomer, neoprene silicone etc. The first O-ring 112, the second O-ring 114, and/or the third O-ring 116 may include a material such as ethylene propylene diene monomer (EPDM) rubber, a fluorocarbon (e.g. Viton®), silicone, a perflurorelastomer or FKM and Kalrez® etc.

In various embodiments, the chamber body 102 may be made of a metal such as aluminium, stainless steel, or titanium. In various other embodiments, the chamber body 102 may be made of a plastic material. In various embodiments, the chamber lid 104 may be made of a metal, such as aluminium, stainless steel, or titanium. In various other embodiments, the chamber lid 104 may be made of a plastic material.

In various embodiments, the optical chip 110 may have a first main surface and a second main surface opposite and parallel to the first main surface. The first main surface and the second main surface of the optical chip 110 may be parallel to a light emitting surface of the infrared source 106 and a detection surface of the detector 108. The first main surface of the optical chip 110 may face the infrared source 106 and the second main surface of the optical chip 110 may face the detector 108, so that infrared light emitted by the infrared source 106 passes from the infrared source 106 through the optical chip 110 to the detector 108.

In various embodiments, the optical chip 110 may allow for gas to pass through. In various embodiments, the optical chip 110 may have an embedded gas channel having an inlet and an outlet. In various embodiments, the inlet and the outlet of the embedded gas channel may be offset from a center of the optical chip 110. In other words, the inlet and the outlet of the embedded gas channel may not be along a center line of the optical chip 110. In various embodiments, the inlet and the outlet of the embedded gas channel may be on a lateral side of the optical chip 110. In various embodiments, the inlet and outlet of the embedded gas channel may both be on the left side of the optical chip 110 or on the right side on the optical chip 110. In various other embodiments, the inlet may be on the left side of the optical chip 110 and the outlet may be on the right side of the optical chip 110, vice versa. The optical chip 110 may be square, rectangular, or of any other suitable shape.

In various embodiments, the inlet of the embedded gas channel may be on a first lateral side of the optical chip 110 and the outlet of the embedded gas channel may be on a second lateral side of the optical chip 110 opposite the first lateral side. In various embodiments, a shape of the optical chip 110 may be square or rectangular.

In various embodiments, the optical chip 110 may have a plurality of interconnected embedded gas channels having 4 openings on lateral sides of the optical chip 110.

In various embodiments, the chamber may include a gas channel to direct gas from an inlet of the chamber body to an inlet of the optical chip 110. The chamber may further include a further gas channel to direct gas from an outlet of the optical chip 110 to the outlet of the chamber body 102. The gas channel of the chamber may be aligned to the inlet of the optical chip 110. The further gas channel of the chamber may be aligned to the outlet of the optical chip 110. During operation, gas may be directed or guided from the inlet of the gas cell to the inlet of the optical chip 110, and from the outlet of the optical chip to the outlet of the gas cell. The gas channel and the further gas channel of the chamber may be defined by the chamber body 102 and the chamber lid 104.

In various embodiments, the gas cell may further include a filter between the optical chip 110 and the detector 108.

In various embodiments, the gas cell may also include a temperature sensor attached to the chamber body 102. The temperature sensor may extend to between the second O-ring and the third O-ring. The temperature sensor may be configured to determine a temperature of the gas.

In various embodiments, the gas cell may include a pressure sensor attached to the chamber body 102. The pressure sensor may extend to between the second O-ring and the third O-ring. The pressure sensor may be configured to determine a pressure of the gas.

In various embodiments, the gas cell may include a heater attached to the chamber body. The heater may be configured to heat the gas to or maintain the gas in the chamber at a desired temperature.

In various embodiments, the gas cell may include a humidity sensor attached to the chamber body. The humidity sensor may extend to between the second O-ring and the third O-ring. The humidity sensor may be configured to determine a humidity of the gas.

In various embodiments, the gas cell may include a feedthrough attached to the chamber body. The feedthrough may extend to between the second O-ring and the third O-ring. The gas cell may include one or more sensors as well as one or more printed circuit boards (PCBs) connected to the one or more sensors via the feedthrough. The one or more sensors may be in contact with the gas in the chamber during operation, while the one or more PCBs may be outside the chamber (i.e. not in contact with the gas). The feedthrough connecting the one or more sensors with the one or more PCBs may prevent gas within the chamber from leaking to outside the chamber, while providing an electrical connection between the one or more sensors and the one or more PCBs.

In various embodiments, the infrared source may be or may include a light emitting diode (LED). The infrared source may be a single emitter, e.g. a single LED, or may be made up or include a plurality of emitters, e.g. a plurality of LEDs. The gas cell may also include a circuit board (e.g. a printed circuit board) coupled to the infrared source, e.g. the emitter or the plurality of emitters.

In various embodiments, the detector may be or may include a photodiode (PD), a photodetector, a pyrodetector, a microbolometer, a thermopile or any other detector that can detect light. The detector may be configured to detect infrared light emitted by the infrared source. As a property of the infrared light, e.g. a wavelength of the infrared light, may be dependent on a property (e.g. a concentration) or type of gas flowing through the chamber, the detector may be configured to determine the property or type of gas based on the infrared light detected. The detector may be a single optical sensor (e.g. a single PD) or is a detection array including a plurality of optical sensors (e.g. a plurality of PDs). The gas cell may also include a circuit board (e.g. a printed circuit board) coupled to the detector, e.g. the optical sensor or the plurality of optical sensors.

In various embodiments, a volume of the space formed by the chamber lid, the chamber body and the optical chip may be $8.75 \times 10^{-7}$ m$^3$ or less.

In various embodiments, a gas concentration detection time of the gas cell may be less than 12 seconds.

FIG. 2 is a general illustration of a method of forming a gas cell according to various embodiments. The method may include, in 202, securing a chamber lid to a chamber body such that the chamber lid cooperates with the chamber body to form a space. The method may also include, in 204, providing an infrared source in a through hole of the chamber lid such that the infrared source extends through a thickness of the chamber lid. The method may further include, in 206, providing a detector in a through hole of the chamber body. The method may additionally include, in 208, arranging an optical chip within the space such that the optical chip is between the infrared source and the detector. The method may also include, in 210, arranging a first O-ring such that the first O-ring between the chamber lid and the chamber body. The method may further include, in 212, arranging a second O-ring such that the second O-ring is between the optical chip and the chamber lid. The method may additionally include, in 214, arranging a third O-ring such that the third O-ring is between the optical chip and the chamber body. The chamber body may include an inlet and an outlet so that the chamber is configured to allow a gas to flow from the inlet through the optical chip to the outlet.

In other words, the method may include securing a chamber lid to a chamber body such that the chamber lid and the chamber body defines a space to accommodate the optical chip. The method may also include providing an infrared source and a detector as well as arranging the first O-ring, the second O-ring, and the third O-ring.

For avoidance of doubt, the steps shown in FIG. 2 may not be in sequence. For instance, step 210 may occur before, at the same time, or after step 212.

In various embodiments, the optical chip, the first O-ring, the second O-ring, and the third O-ring may be arranged within the chamber body before the chamber lid is secured to the chamber body.

In various embodiments, the method may include arranging a filter in the chamber body after securing the chamber lid to the chamber body. The method may also include arranging a filter cover into the chamber body after arranging the filter. The method may further include arranging or providing the detector after arranging the filter cover, so that the filter is between the optical chip and the detector. The method may also include arranging or providing the infrared source after securing the chamber lid to the chamber body.

In various embodiments, the chamber lid may be secured to the chamber body using a plurality of screws.

Figure 3A:
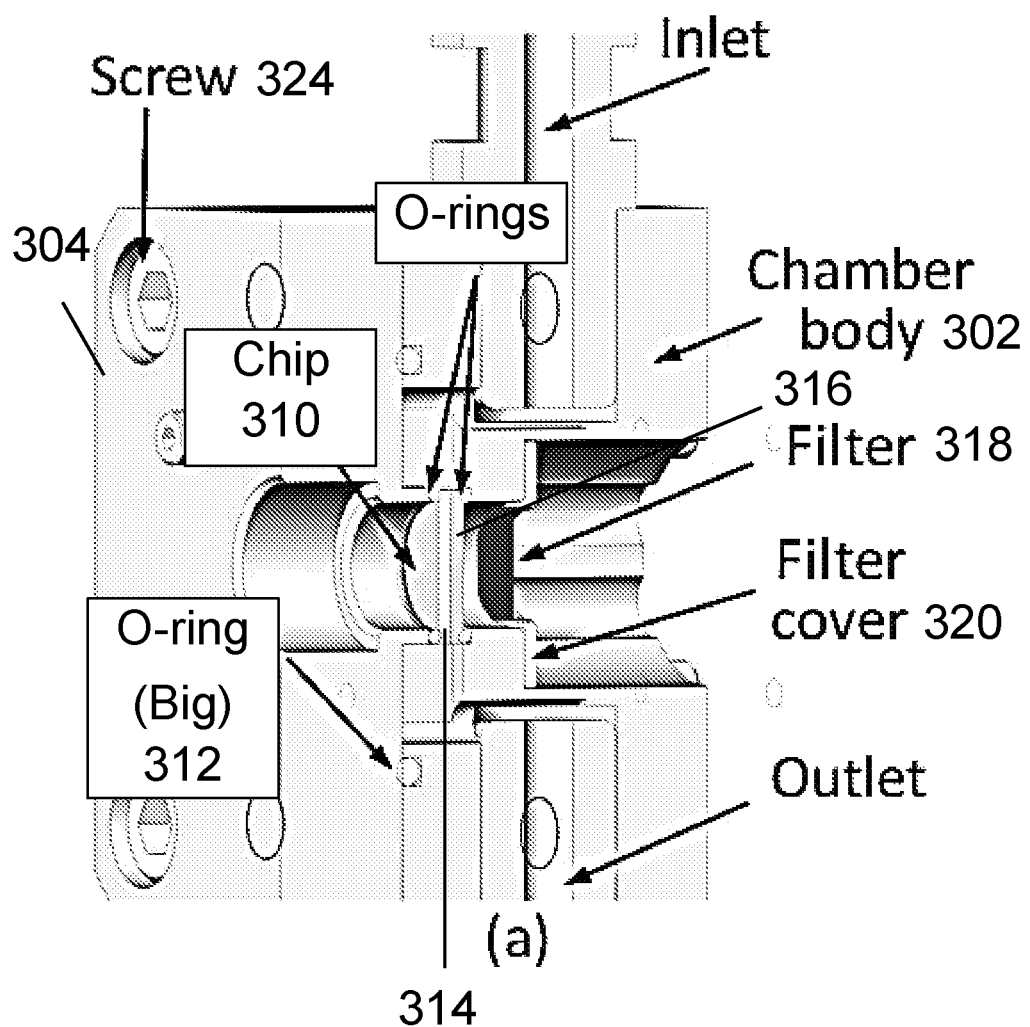
FIG. 3A shows a cross-sectional side view of a gas cell according to various embodiments.
Figure 3B:
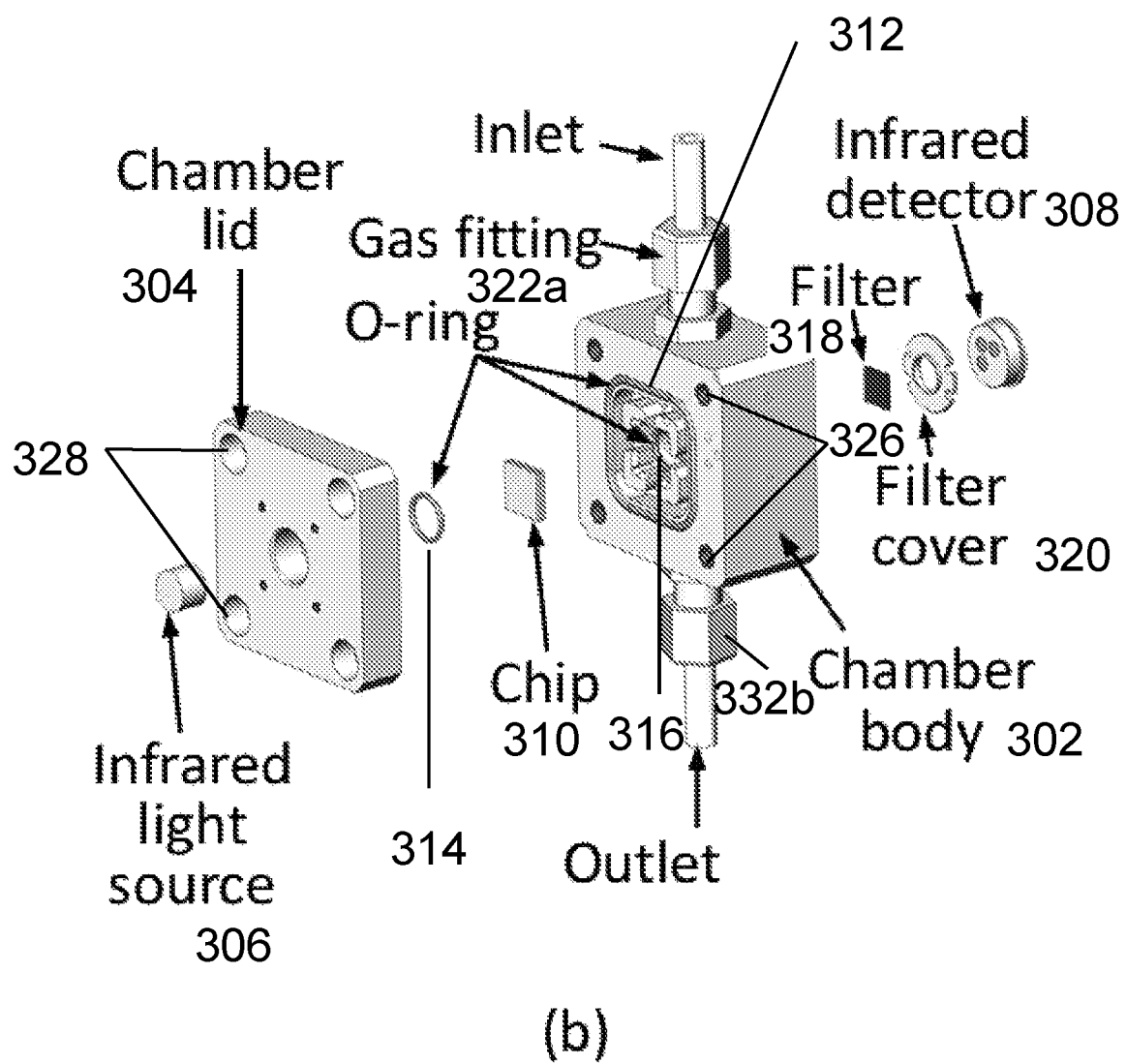
FIG. 3B shows an exploded view of the gas cell according to various embodiments.

FIG. 3A shows a cross-sectional side view of a gas cell according to various embodiments. FIG. 3B shows an exploded view of the gas cell according to various embodiments. The gas cell may include a chamber body 302 and a chamber lid 304. The gas cell may also include a first O-ring 312, which may be a big Viton® O-ring, as well as second O-ring 314 and third O-ring 316, which may be small Viton® O-rings. The gas cell may additionally include an optical chip 310, an infrared light source 306 and a detector 308 for detecting optical signal variations. The infrared light source 306 and the detector 308 may be installed on opposite sides of the optical chip 310. The gas cell may also include a filter 318 between the optical chip 310 and the detector 308. The gas cell may further include a filter cover 320 between the filter 318 and the detector 308. The gas cell may additionally include a first gas fitting 322a leading into the chamber defined by the chamber body 302 and the chamber lid 304. The first gas fitting 322a may act as an inlet for the gas to flow into the chamber. The gas cell may also include a second gas fitting 322b leading out of the chamber. The second gas fitting 322b may act as an outlet for the gas to flow out of the chamber. The chamber lid 304 may have four mounting holes 328, while the chamber body 302 may have four threadholes 326. The gas cell may include 4 screws 324, which each screw 324 configured to pass through a respective mounting hole 328 of the chamber lid 304 into a respective threadhole 326 of the chamber body 302, thereby securing the chamber lid 304 onto the chamber body 302.

Figure 3C:
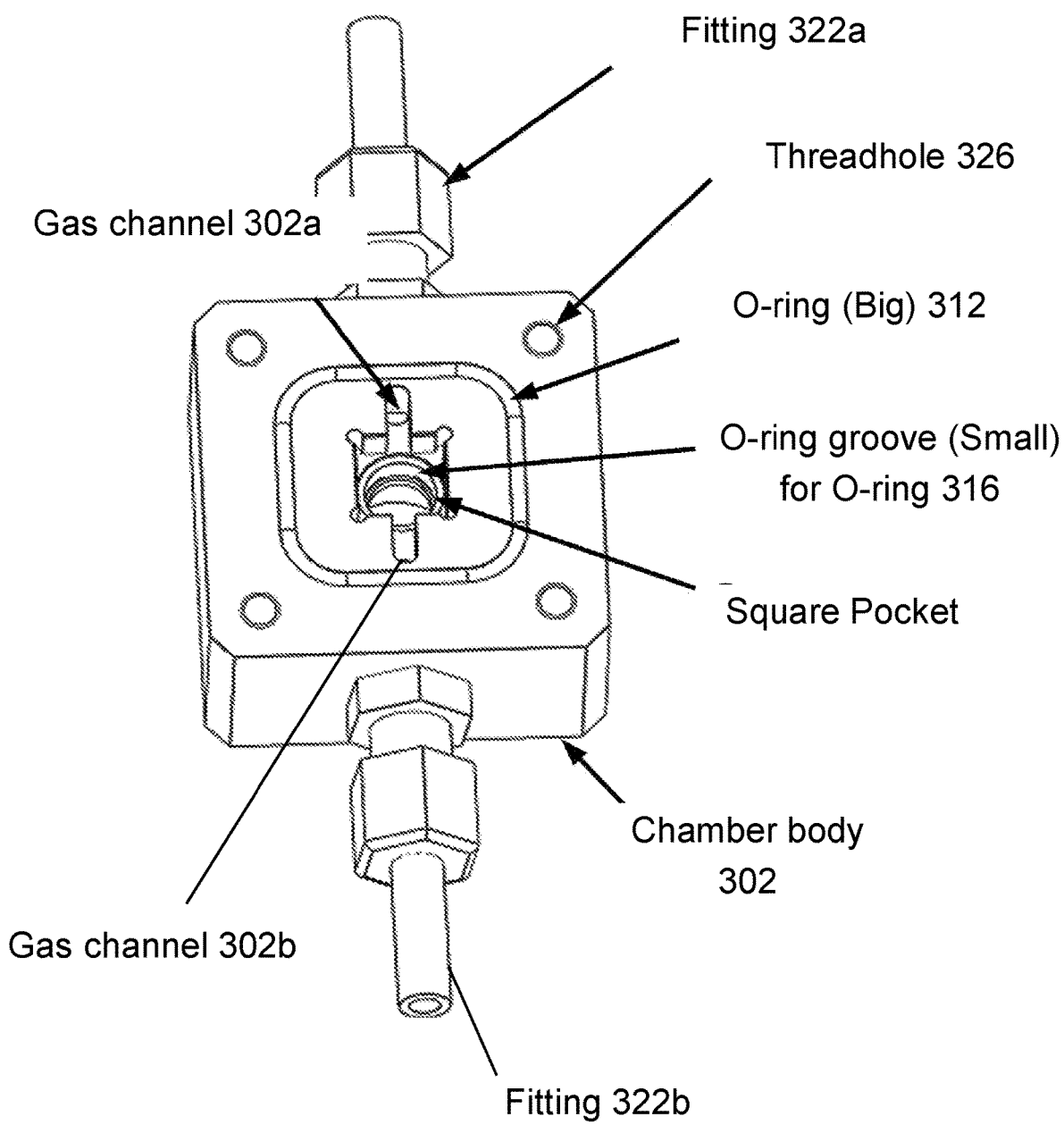
FIG. 3C shows a schematic of the chamber body according to various embodiments.
Figure 3D:
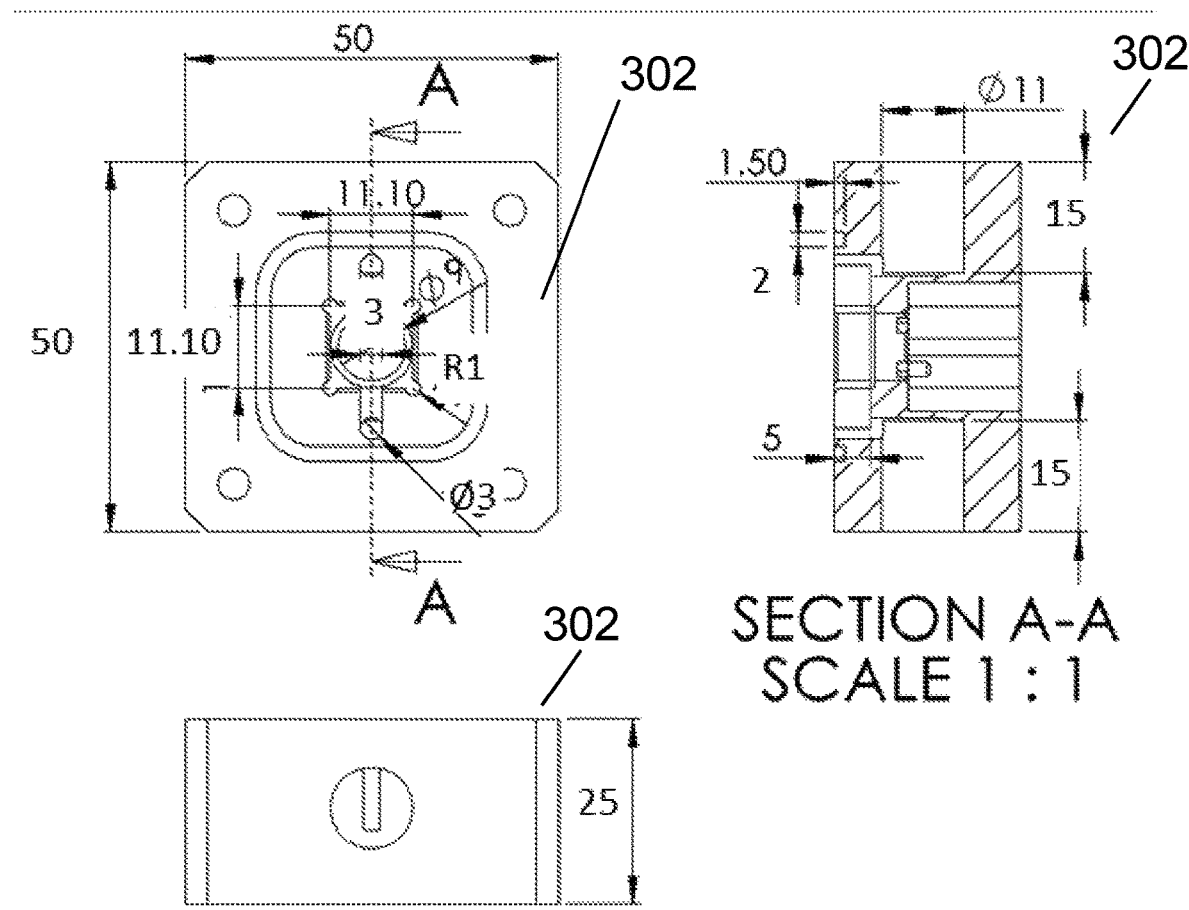
FIG. 3D is a schematic showing the body dimensions of the chamber body according to various embodiments.

FIG. 3C shows a schematic of the chamber body 302 according to various embodiments. FIG. 3D is a schematic showing the body dimensions of the chamber body 302 according to various embodiments. The chamber body 302 may be made of aluminium. The overall size may be 50 mm×50 mm×25 mm. A square pocket of 11.1 mm×11.1 mm may be designed for holding the optical chip 310. A diameter 9 mm through hole may be designed for optical applications. Two commercial gas fittings 322a, 322b may be fixed to the chamber body 302 using threads on the chamber body 302. Two holes with 3 mm in diameter may be used to connect the gas fitting 322a to the chamber body 302 at the inlet and to connect the gas fitting 322b to the chamber body 302 at the outlet. Two O-ring grooves may be designed on the chamber body 392. A small O-ring (i.e. O-ring 316) may be used for sealing the optical chip 310, and a big O-ring (i.e. O-ring 312) may be used to seal the chamber body 302 to chamber lid 304. Four threadholes 326 may be provided at four corner regions of the chamber body 302. Screws 324 may be used to tighten the chamber lid 304 and the chamber body 302 together after assembly. The gas channel 302a, 302b may be defined when the chamber lid 304 is secured to the chamber body 302. The gas channel 302a may be used to carry the gas from the inlet to the optical chip 310, and the gas channel 302b may be used to carry the gas from the optical chip 310 to the outlet. Another pocket from the back for the chamber body 302 may be used for installation of the filter 318 and the filter cover 320. A detector 308, e.g. a photodiode (PD), may be installed from the back.

Figure 3E:
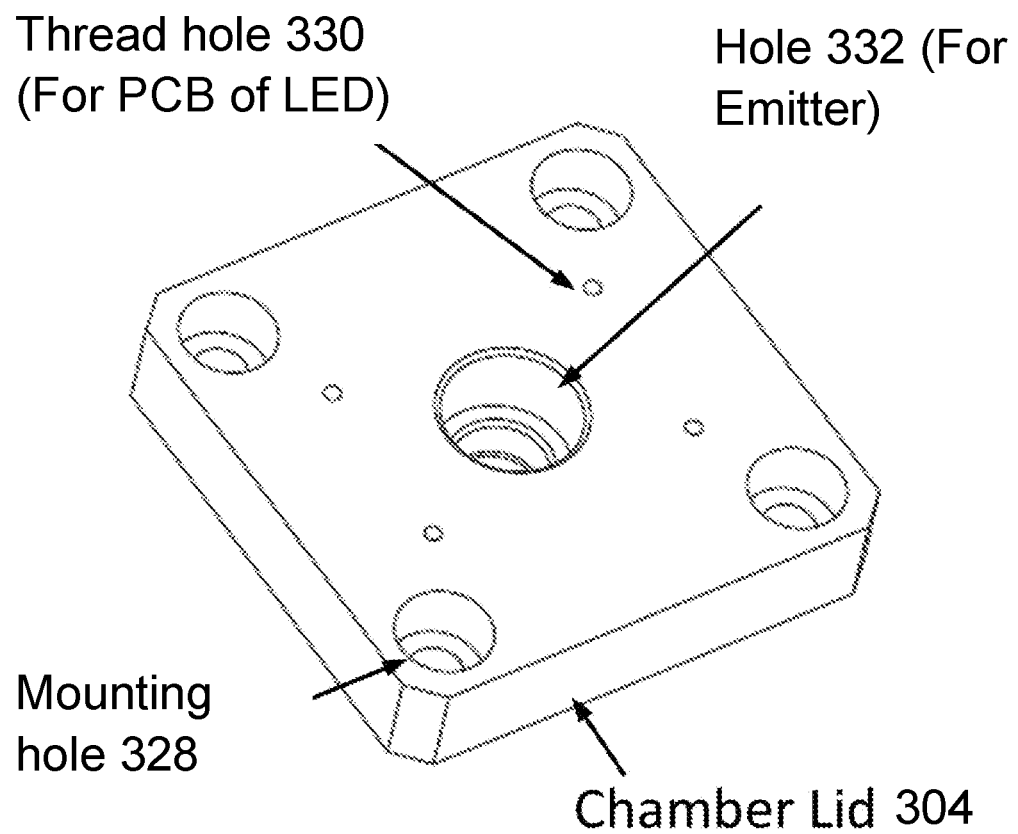
FIG. 3E shows a schematic of the chamber lid according to various embodiments.
Figure 3F:
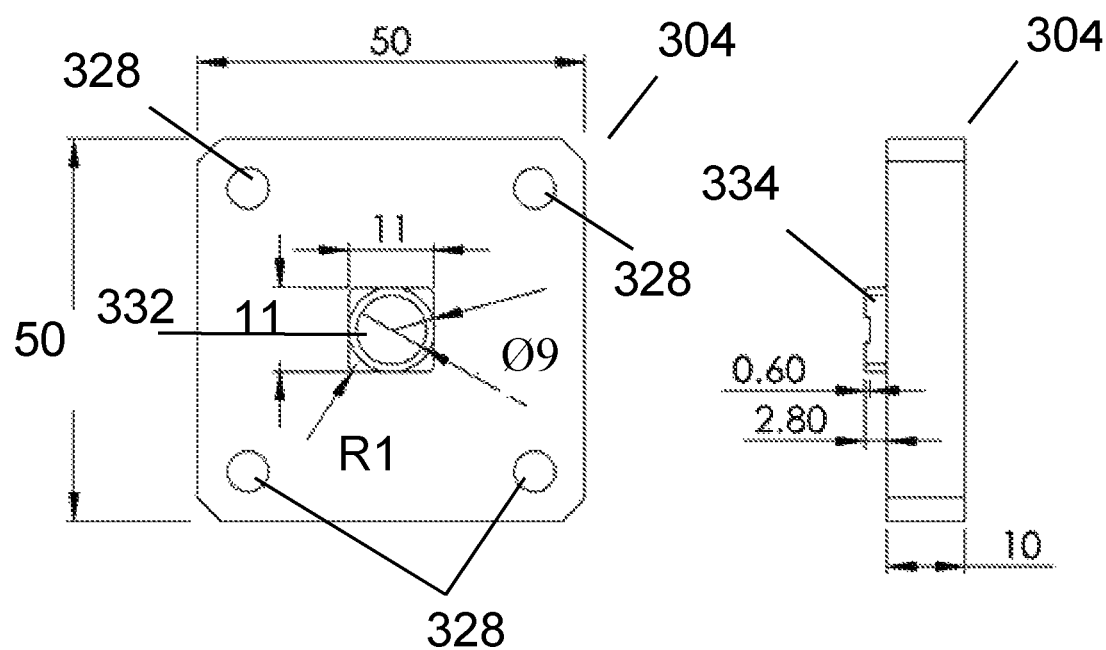
FIG. 3F is a schematic showing the body dimensions of the chamber lid according to various embodiments.

FIG. 3E shows a schematic of the chamber lid 304 according to various embodiments. FIG. 3F is a schematic showing the body dimensions of the chamber lid 304 according to various embodiments. The chamber lid 304 may be made of aluminium too. The overall size of the chamber lid 304 may be 50 mm×50 mm×10 mm with a 11 mm×11 mm×2.8 mm extrusion 334 at the middle portion of the chamber lid 304 for clamping the optical chip 310. A diameter 9 mm through hole 332 may be for optical applications. The extrusion 334 may define the through hole 332. An O-ring groove may be designed to accommodate an O-ring 314 for sealing the optical chip 310. A pocket from another side may be used for installation of the infrared light source 306, e.g. an emitter such as a light-emitting diode (LED). Four small thread holes 330 may be used for mounting a circuit board (i.e. printed circuit board (PCB)) coupled to the LED.

Figure 3G:
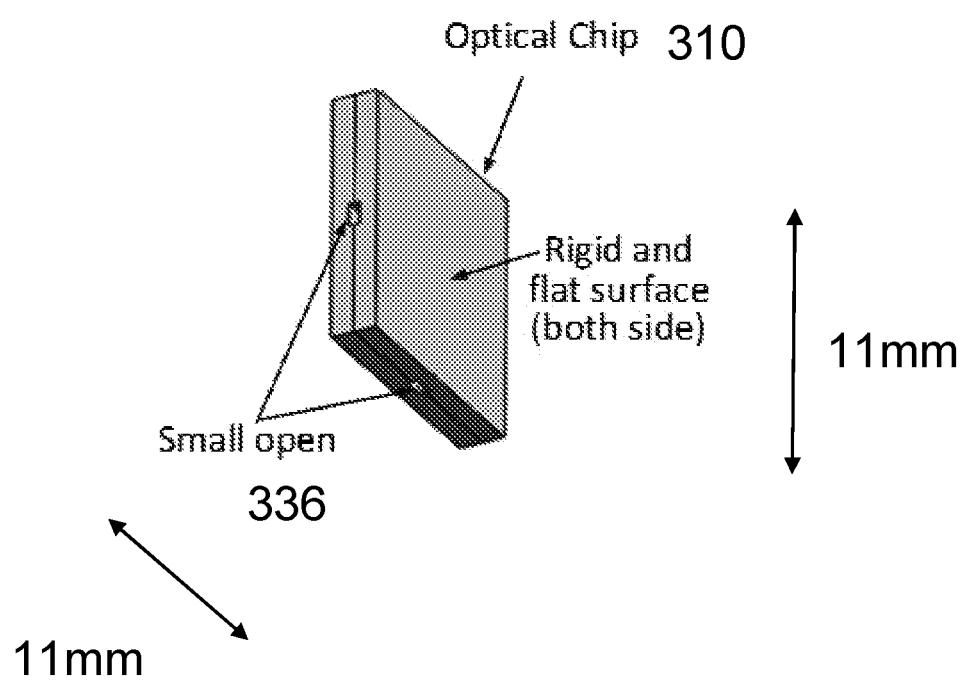
FIG. 3G shows a schematic of the optical chip according to various embodiments.
Figure 3H:
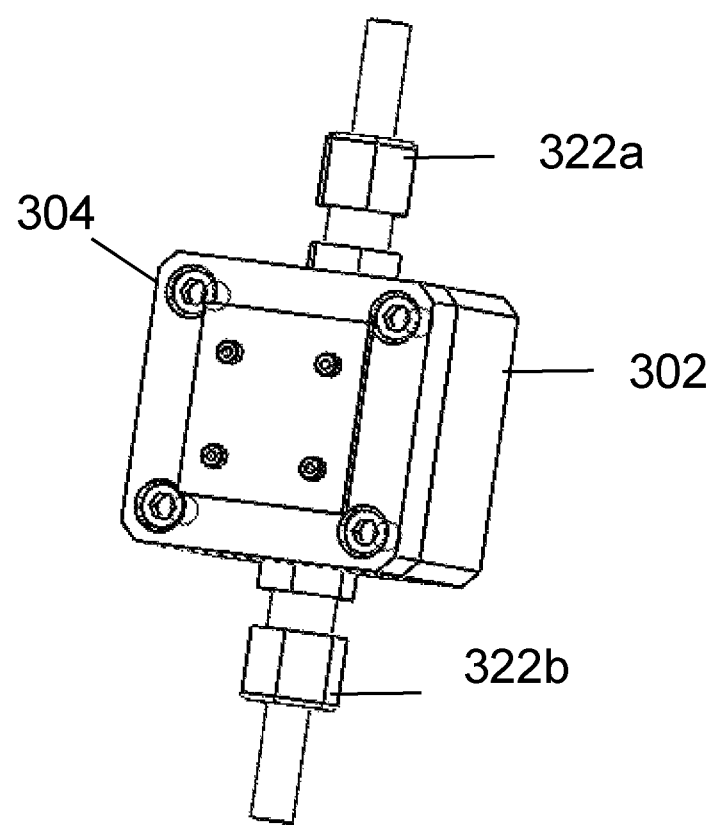
FIG. 3H shows an exterior view of the assembled gas cell according to various embodiments.

FIG. 3G shows a schematic of the optical chip 310 according to various embodiments. The optical chip 310 may be designed and fabricated in-house. The chip 310 may have an overall size of 11 mm×11 mm×2 mm. A small open 336 may be provided at the middle of each side of the optical chip 310. The optical chip 310 may have a total of 4 connected opens 336. The optical chip 310 may be rigid and may have 2 flat surfaces. The distance between the infrared source 306 and the detector 308, i.e. the window distance, may be about 2 mm. FIG. 3H shows an exterior view of the assembled gas cell according to various embodiments.

Figure 4A:
FIG. 4A is a process flow of forming the gas cell according to various embodiments.
Figure 4A:
Figure 4A:
Figure 4A:
Figure 4A:
Figure 4B:
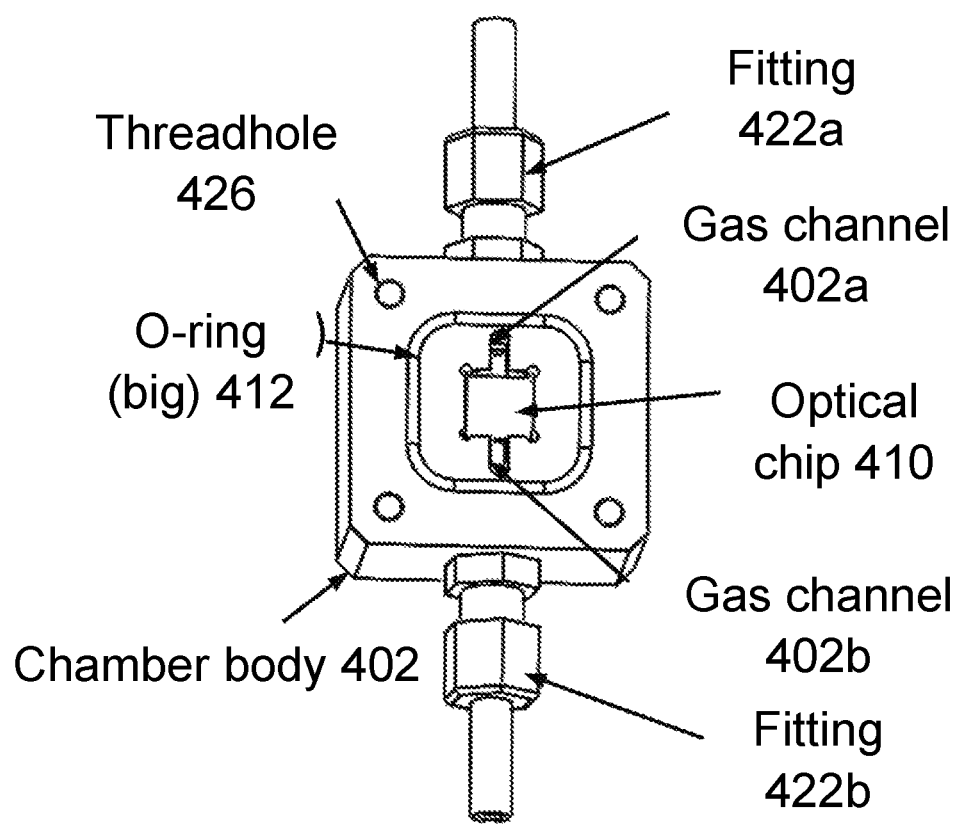
FIG. 4B is a schematic showing the chamber body with the optical chip according to various embodiments.
Figure 4C:
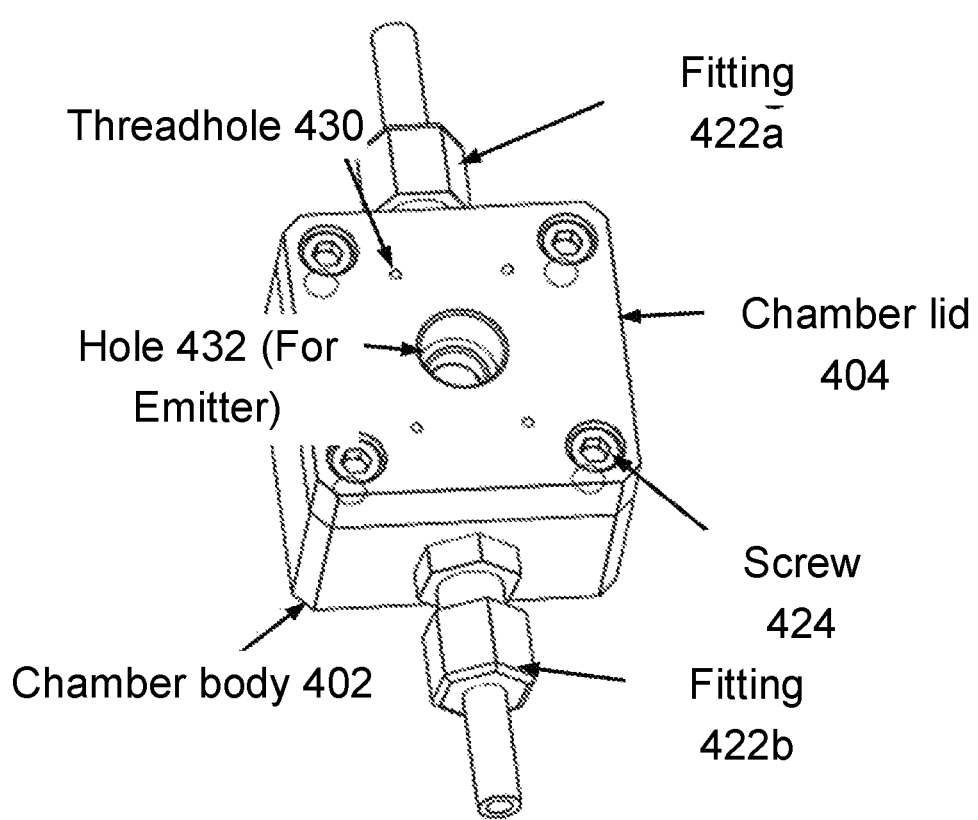
FIG. 4C is a schematic showing the front view of the gas cell with screws according to various embodiments.
Figure 4D:
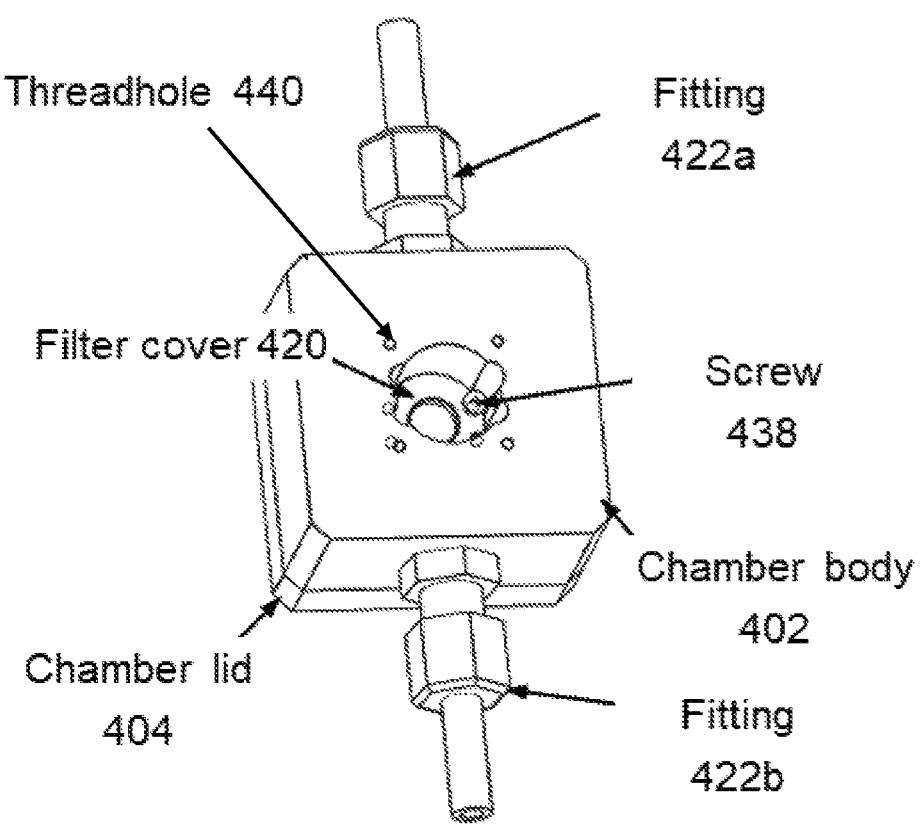
FIG. 4D is a schematic showing the back view of the gas cell with filter cover according to various embodiments.

FIG. 4A is a process flow of forming the gas cell according to various embodiments. FIG. 4B is a schematic showing the chamber body 402 with the optical chip 410 according to various embodiments. FIG. 4C is a schematic showing the front view of the gas cell with screws 424 according to various embodiments. FIG. 4D is a schematic showing the back view of the gas cell with filter cover 420 according to various embodiments.

Under (a) as shown in FIG. 4A, the chamber body 402 may be prepared for assembly, while under (b) the optical chip 410 may be placed in the chamber body 402. The chamber body 402 may be cleaned using isopropyl alcohol (IPA), and fixed with fittings 422a, 422b. A small O-ring and a big O-ring 412 may be cleaned and installed in the grooves present in the chamber body 402. The chamber body 402 may include a gas channel 402a configured to direct gas from the fitting 422a to the optical chip 410, and a gas channel 402b configured to direct gas from the optical chip 410 to the fitting 422b.

Under (c), the chamber lid 404 may be cleaned using IPA. A small O-ring may be cleaned and installed in the groove present on the chamber lid 404. Under (d), the chamber lid 404 may be arranged on the chamber body 402 with the small O-ring facing the chip. 4 screws 424 may be used to secure the chamber lid 404 to the chamber body 402 by passing the screws 424 through the mounting holes of the chamber lid 404 onto the threadholes 426 of the chamber body 402. There may also be an optional step of installing the filter. The filter may be positioned into the back pocket of the chamber body 402. The filter cover 420 may be put on, and two small screws 438 may be used to secure the filter cover 420. The detector, e.g. a photodiode (PD), may also be installed, and screws may be passed into threadhole 440 to secure the circuit board coupled to the photodiode. The infrared source, e.g. an emitter such as a light emitting diode, may be installed into the hole 432, and screws may be passed into threadholes 430 to secure the circuit board coupled to the infrared source.

Various embodiments may relate to a gas cell. The gas cell may be a gas concentration detection system with an optical chip. The inlet and outlet of the optical chip may be on the side of the optical chip. The system or gas cell may include a chamber, and the optical chip may be arranged in the middle of the chambers. Two O-rings may be used to seal the chip with the chamber. The gas inlet may be connected in to the chip inlet. There may be no seal between the side of the optical chip and the chamber. However, the tolerance may be well controlled, within 0.05-0.1 mm gap per side.

The gas may pass from both the gap and the inlet of the optical chip. The minimized gap may enable most of the gas to flow into the optical chip, and may be critical in enabling the quick response.

The chamber may be designed with two parts (i.e. chamber body and chamber lid) for reduced fabrication cost, and a big O-ring may be used to seal the chamber during assembly. For assembly, the optical chip may be placed with O-rings on both sides into the chamber body before closing with the chamber lid. Both the chamber body and lid may then be screwed together tightly with a big O-ring to minimize leakage. The optical filter may be installed parallel to the chip. The infrared source may be installed on one side of the chip, and the detector may be installed on an opposing side of the optical chip for signal detection.

In various embodiments, the inlet and outlet of the optical chip may be offset from the center. In various embodiments, the inlet and outlet may both be on the left side of the optical chip or on the right side on the optical chip. In various other embodiments, the inlet may be on the left side of the optical chip and the outlet may be on the right side of the optical chip, vice versa. The optical chip may be square, rectangular, or of any other suitable shape. The two main surfaces of the optical chip may be required to be parallel. In various embodiments, the gas cell or the optical chip may include a pressure sensor, a temperature sensor, a humidity sensor or a feed through.

Figure 5:
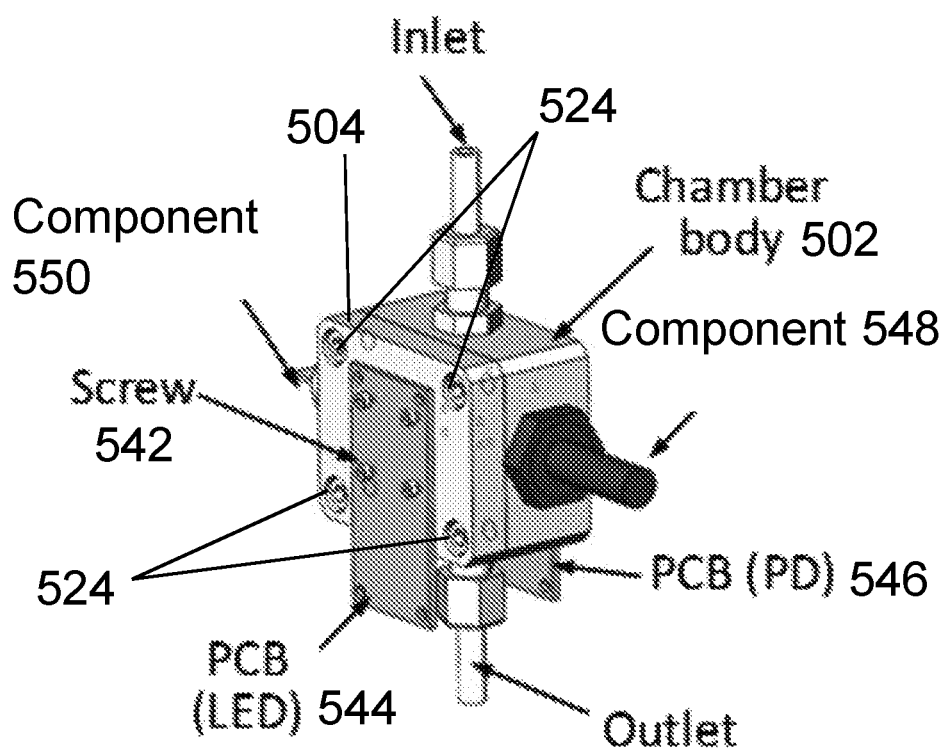
FIG. 5 is a schematic of a gas cell according to various embodiments.

FIG. 5 is a schematic of a gas cell according to various embodiments. The gas cell may include a chamber body 502 and a chamber lid 504. Screws 524 may be used to secure the chamber lid 504 to the chamber body 502. The gas cell may also include an infrared source such as an LED, and a detector such as a PD. Screws 524 may be used to secure the printed circuit board (PCB) 544 (which is coupled to the LED) to the chamber lid 504. Similarly, screws may be used to secure the PCB 546 (which is coupled to the PD) to the chamber body 502. The component 548 and the component 550 may be attached to the chamber body 502. In various embodiments, the component 548 may be a pressure sensor, and the component 550 may be a temperature sensor. The components 548, 550 may each extend to between the second O-ring and the third O-ring. The gas cell may additionally or alternatively include a heater, a humidity sensor and/or a feed through. In various embodiments, the component 548 and/or the component 550 may be the heater, the humidity sensor and/or the feed through.

Figure 6A:
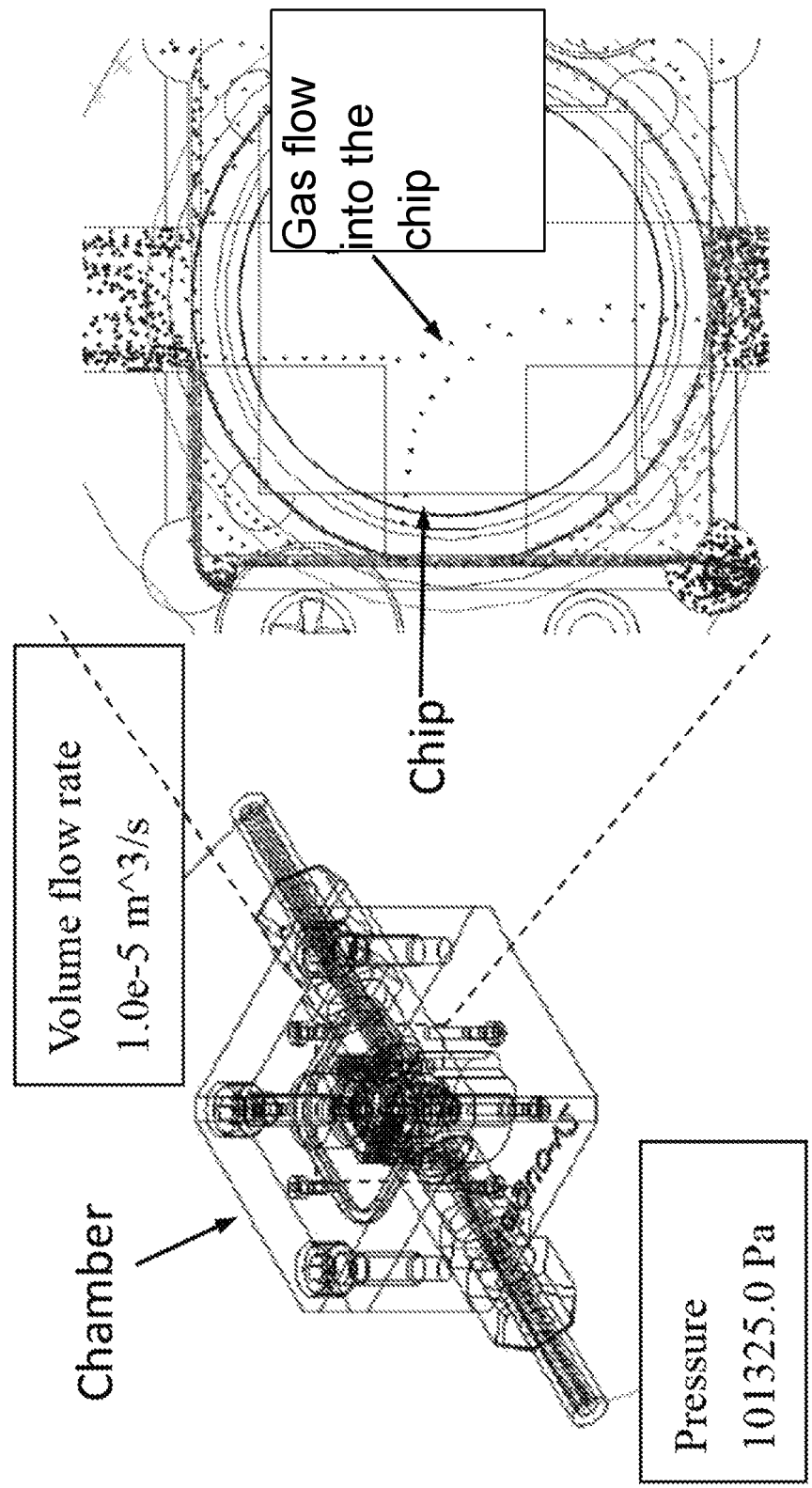
FIG. 6A shows the flow simulation results of the gas cell according to various embodiments.

FIG. 6A shows the flow simulation results of the gas cell according to various embodiments. SolidWorks FloXpress was used for the simulation. Volume flow rate may be set to 1.0000e−005 m^3/s at the inlet. Environment pressure may be set to 101325.00 Pa at outlet. Temperature may be set to 293.20 K using air as the fluid. The result shows that the air is able to flow through the chip. The maximum velocity is 58.454 m/s. There is no leak to the environment from the chamber. The air mainly passes through the gap between the side of the chip and the chamber.

Figure 6B:
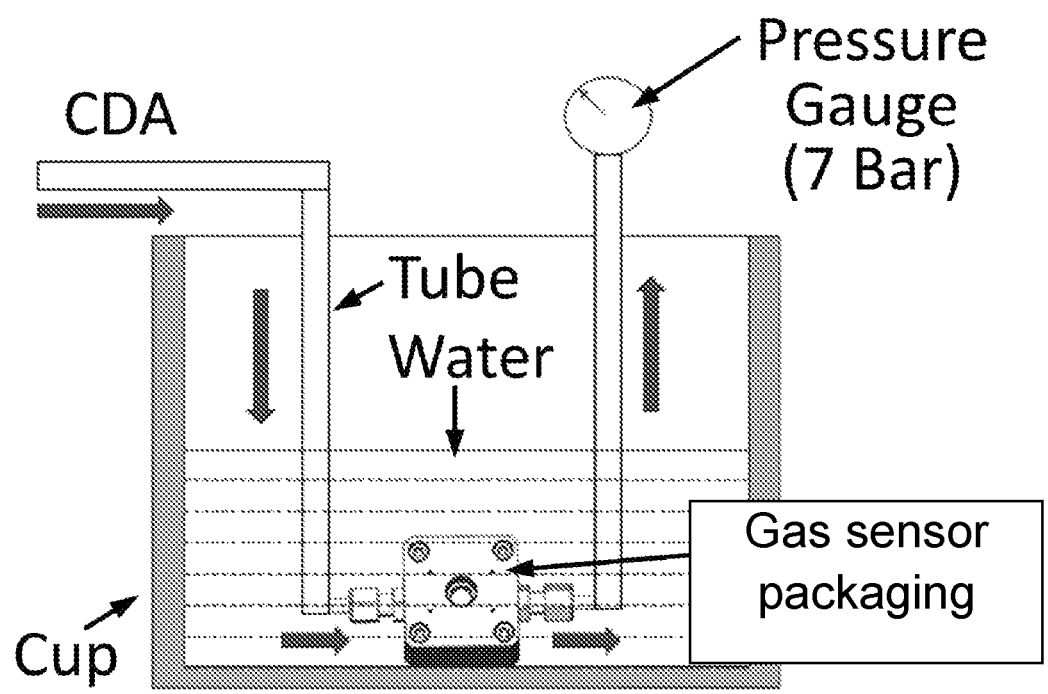
FIG. 6B is a schematic of the gas cell according to various embodiments being subjected to a pressure test using compressed dry air (CDA).

FIG. 6B is a schematic of the gas cell according to various embodiments being subjected to a pressure test using compressed dry air (CDA). The result shows no bubble in water at 7 bars.

Figure 6C:
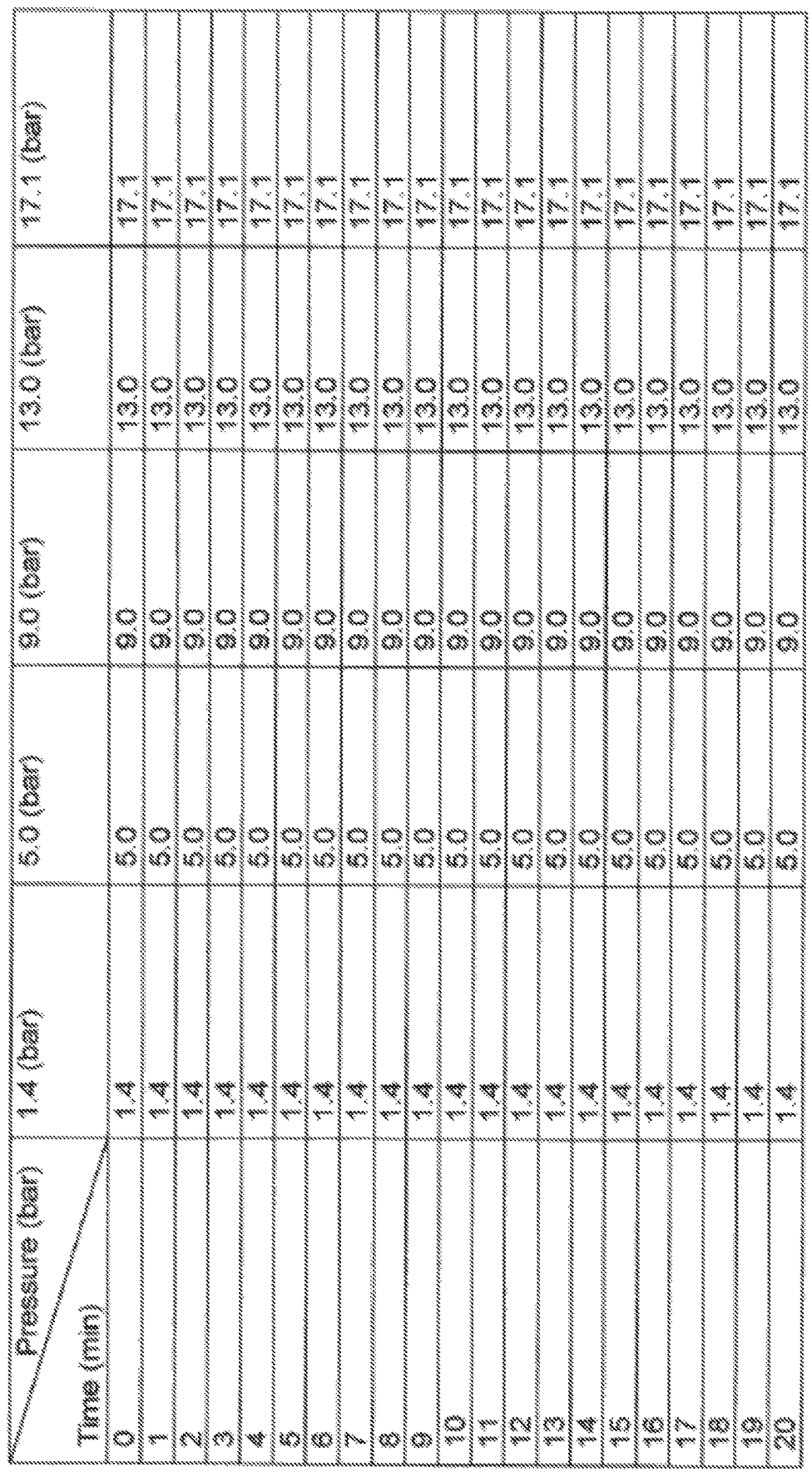
FIG. 6C shows the results of the leak tests of the gas cell according to various embodiments.

Testing of the chamber has been conducted using further pressure tests and leakage tests at the National Metrology Centre (NMC). The chamber assembly was pressurized with pure nitrogen gas at nominal pressure values of 1 bar, 5 bars, 9 bars, 13 bars and 17 bars for a period of about 20 minutes each. The pressure levels were measured every minute. The snoop test was performed at 17 bar. The result shows that the gas cell can hold the pressure at each of the settings, and there were no leaks found on the gas cell when the snoop test was performed at 17.1 bar. FIG. 6C shows the results of the leak tests of the gas cell according to various embodiments.

Figure 6D:
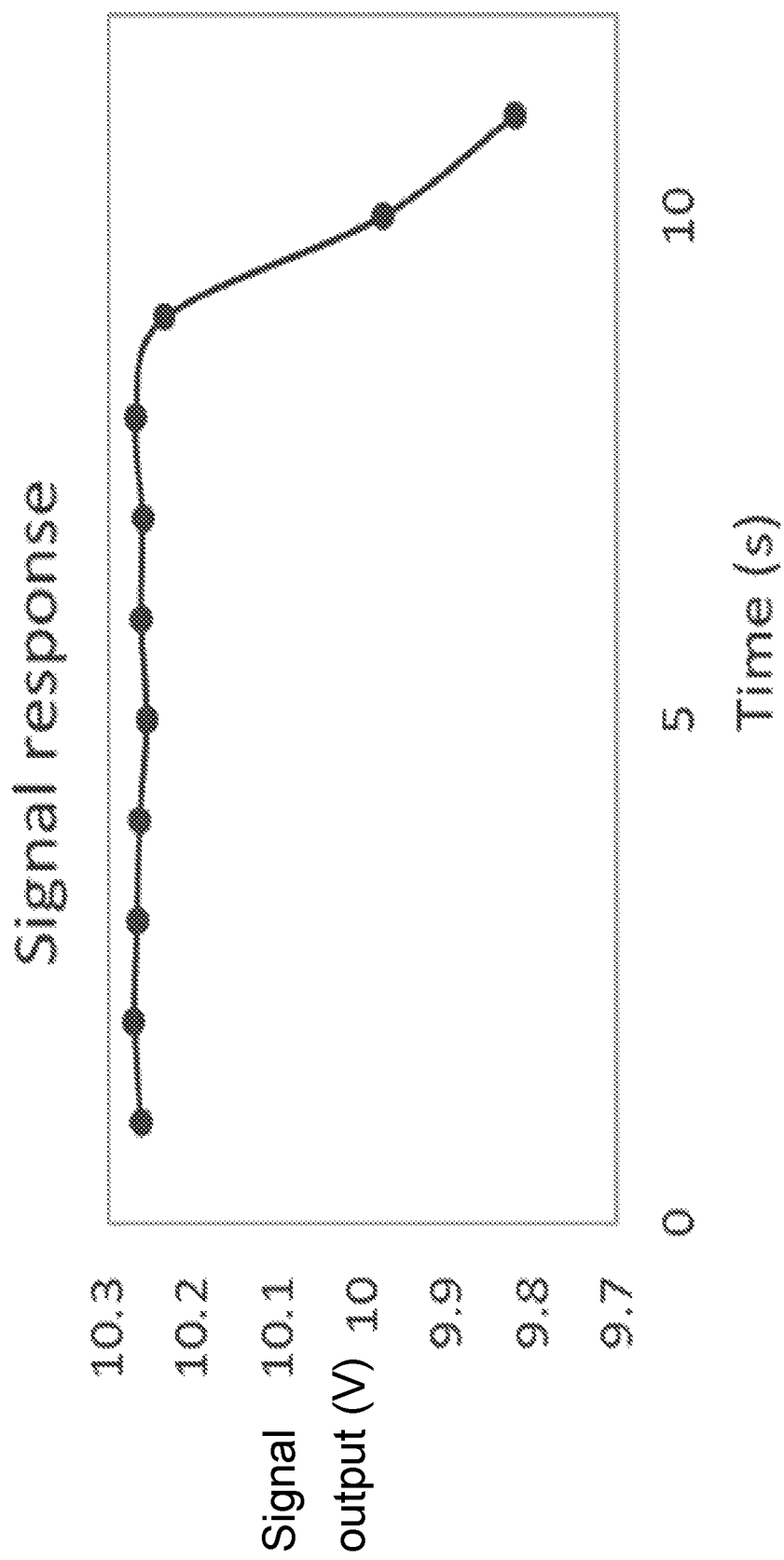
FIG. 6D is a plot of signal output (in volts or V) as a function of time (in seconds or s) illustrating the response time of the gas cell according to various embodiments.

Experimental tests were also conducted on the gas cell. A gas with known concentration is flowed into the gas cell before t=0 s. At t=0 s, the gas concentration was changed using mass flow controllers, and the change in signal in the gas cell was recorded. FIG. 6D is a plot of signal output (in volts or V) as a function of time (in seconds or s) illustrating the response time of the gas cell according to various embodiments. A response time of 11 s was recorded. This may significantly be faster than commercial non-dispersive infra-red (NDIR) gas sensor which would require 120 s or longer. This was achieved as the gas cell allows the gas to flow through the miniaturized optical chip and not anywhere else. Since the volume of the gas cell is small, the response time may be quick when the gas cell is implemented in an inline flow-through system.

Figure 7A:
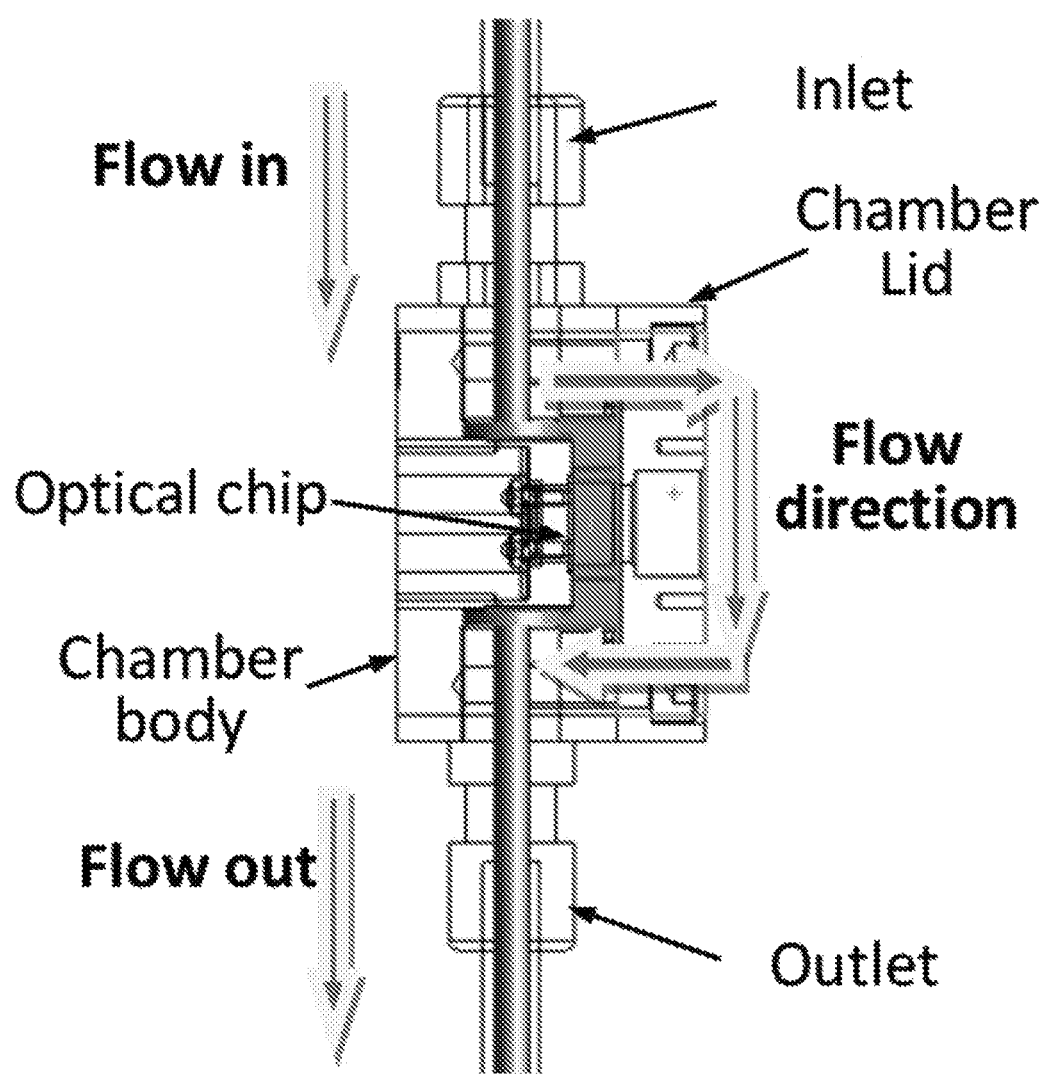
FIG. 7A is a side view flow diagram of a gas cell according to various embodiments.
Figure 7B:
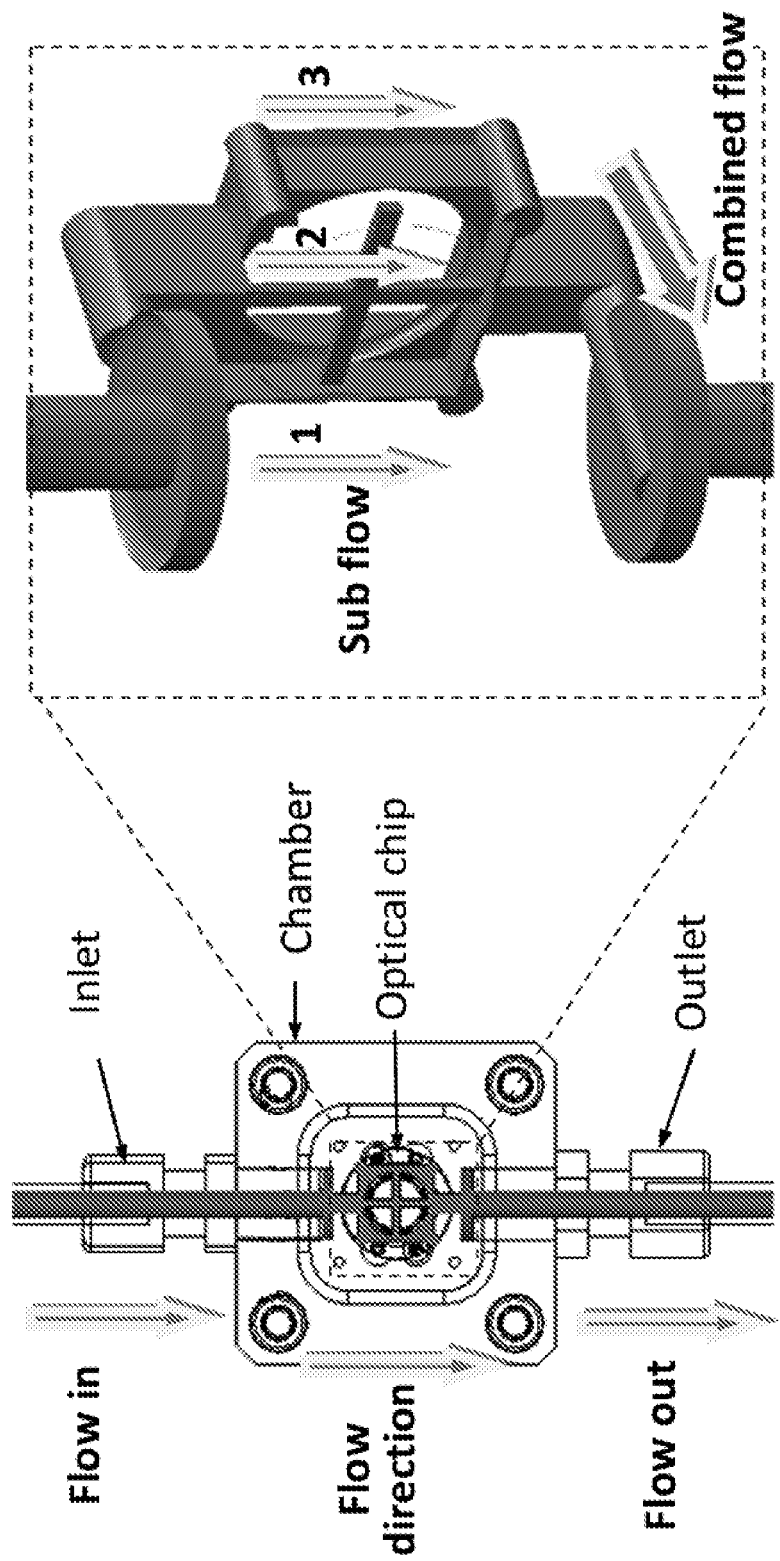
FIG. 7B shows (left) a front view flow diagram of the gas cell according to various embodiments, and (right) an enlarged isometric view flow diagram of the gas cell according to various embodiments.

FIG. 7A is a side view flow diagram of a gas cell according to various embodiments. FIG. 7B shows (left) a front view flow diagram of the gas cell according to various embodiments, and (right) an enlarged isometric view flow diagram of the gas cell according to various embodiments. The total volume is 8.75e−007 m^3. As shown in FIGS. 7A-B, the flow feed in from the inlet may be split into 3 sub flows. The middle sub flow (Sub flow 2) may go into the optical chip, and another 2 sub flows (Sub flow 1 and Sub flow 3) may bypass to the left side and right side of the optical chip. The 3 sub flows may be combined after the optical chip into one flow and may go out of the chamber from the outlet. For a Volume Flow Rate of 1.0000e−005 m^3/s at the inlet, the volume of the chamber may be filled in 0.09 seconds.

Various embodiments may have a small chamber and a small optical chip cavity, thereby leading to faster response time. Various embodiments may reduce gas concentration detection time to within 12 seconds. Also, less gas sample may be required. Various embodiments may allow for more flexibilities and more accurate control.

The optical chip may be arranged between the inlet and the outlet, leading to more accurate results and fast response.

As the LED and PD are not sharing the gas inlet and the gas outlet of the optical chip, there may be less interference induced by the gas flow. The gas flow may not be blocked by the optical accessories.

The LED and PD may be arranged near the top surface, and the bottom surface of the optical chip. As such, the design may be very compact. The design may be suitable for space constrained applications.

Sealing of the optical chip may be carried out using 2 O-rings (one to the chamber body and another to the chamber lid), thereby facilitating assembly and reliable sealing. The optical chip may be easily replaced during maintenance or upgrading.

The LED, filter and PD may be installed outside of the sealing area, and hence can be replaced easily without affecting the sealing properties of the system.

Modular design of the optical chip module, the filter, the LED and the PD may mean that the various components can be developed independently. A module can be improved to replace a corresponding original one in the gas cell. As such, development time may be reduced. Further, product portfolios with different modules may be developed to address business needs.

Various components may be commercially available, which lead to lower costs and reliable supply chain.

In various embodiments, the chamber body and the chamber lid may be made of aluminium, which is a low cost material. The material may be changed depending on the specific application and gas involved. For instance, the chamber body and the chamber lid may be made of stainless steel, titanium for more corrosive gases, and plastic materials for low cost mass production.

The optical chip, LED, optical filter and PD may face one another. Wafer bonding and flip chip integration methods may potential designs to lower costs. Application specific integrated circuit (ASIC) chips may be flip chip bonded at the back of the LED or PD for signal processing and performance improvement.

In various embodiments, the gap between the optical chip and the chamber may be 0.1 mm on each side. Only a small amount of gas may be present on the optical chip due to the small chip cavity.

In various embodiments, filters, detectors such as PDs, infrared sources such as LEDs may be added from both side of the optical chip for gas concentration detection. The detector and infrared source may be placed outside of the chamber, and may be arranged very close to each other.

Heaters, pressure sensors, temperature sensors, humidity sensors and feedthrough may be added as required, e.g. before, after or on both sides of the optical chip along the gas flow path.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. A gas cell comprising:
   a chamber body;
   a chamber lid cooperating with the chamber body to form a space;
   an infrared source provided in a through hole of the chamber lid such that the infrared source extends through a thickness of the chamber lid;
   a detector provided in a through hole of the chamber body;
   an optical chip arranged within the space such that the optical chip is between the infrared source and the detector;
   a first O-ring arranged between the chamber lid and the chamber body;
   a second O-ring arranged between the optical chip and the chamber lid; and
   a third O-ring arranged between the optical chip and the chamber body;
   wherein the chamber body includes an inlet and an outlet so that the chamber body is configured to allow a gas to flow from the inlet through the optical chip to the outlet.

2. The gas cell according to claim 1,
   wherein the optical chip has a first main surface and a second main surface opposite and parallel to the first main surface.

3. The gas cell according to claim 2,
   wherein the first main surface and the second main surface of the optical chip are parallel to a light emitting surface of the infrared source and a detection surface of the detector.

4. The gas cell according to claim 2,
   wherein the first main surface of the optical chip faces the infrared source and the second main surface of the optical chip faces the detector, so that infrared light emitted by the infrared source passes from the infrared source through the optical chip to the detector.

5. The gas cell according to claim 1,
   wherein the optical chip has an embedded gas channel having an inlet and an outlet.

6. The gas cell according to claim 5,
   wherein the inlet and the outlet of the embedded gas channel are offset from a center of the optical chip.

7. The gas cell according to claim 5,
   wherein the inlet and the outlet of the embedded gas channel are on a lateral side of the optical chip.

8. The gas cell according to claim 5,
   wherein the inlet of the embedded gas channel is on a first lateral side of the optical chip and the outlet of the embedded gas channel is on a second lateral side of the optical chip opposite the first lateral side.

9. The gas cell according to claim 1,
   wherein a shape of the optical chip is square or rectangular.

10. The gas cell according to claim 1,
wherein the optical chip has a plurality of interconnected embedded gas channels having 4 openings on lateral sides of the optical chip.

11. The gas cell according to claim 1, further comprising:
a filter between the optical chip and the detector.

12. The gas cell according to claim 1, further comprising:
a temperature sensor attached to the chamber body,
wherein the temperature sensor extends to between the second O-ring and the third O-ring.

13. The gas cell according to claim 1, further comprising:
a pressure sensor attached to the chamber body;
wherein the pressure sensor extends to between the second O-ring and the third O-ring.

14. The gas cell according to claim 1,
wherein a gas concentration detection time of the gas cell is less than 12 seconds.

15. The gas cell according to claim 1, further comprising:
a humidity sensor attached to the chamber body;
wherein the humidity sensor extends to between the second O-ring and the third O-ring.

16. The gas cell according to claim 1, further comprising:
a feedthrough attached to the chamber body,
wherein the feedthrough extends to between the second O-ring and the third O-ring.

17. The gas cell according to claim 1,
wherein the infrared source is a single emitter or a plurality of emitters.

18. The gas cell according to claim 1,
wherein the detector is a single optical sensor or is a detection array comprising a plurality of optical sensors.

19. A method of forming a gas cell, the method comprising:
securing a chamber lid to a chamber body such that the chamber lid cooperates with the chamber body to form a space;
providing an infrared source in a through hole of the chamber lid such that the infrared source extends through a thickness of the chamber lid;
providing a detector in a through hole of the chamber body;
arranging an optical chip within the space such that the optical chip is between the infrared source and the detector;
arranging a first O-ring such that the first O-ring is between the chamber lid and the chamber body;
arranging a second O-ring such that the second O-ring is between the optical chip and the chamber lid; and
arranging a third O-ring such that the third O-ring is between the optical chip and the chamber body;
wherein the chamber body includes an inlet and an outlet so that the chamber body is configured to allow a gas to flow from the inlet through the optical chip to the outlet.

20. The method according to claim 19, further comprising:
arranging a filter in the chamber body after securing the chamber lid to the chamber body;
arranging a filter cover into the chamber body after arranging the filter; and
arranging the detector after arranging the filter cover, so that the filter is between the optical chip and the detector.

* * * * *